Figure 1:
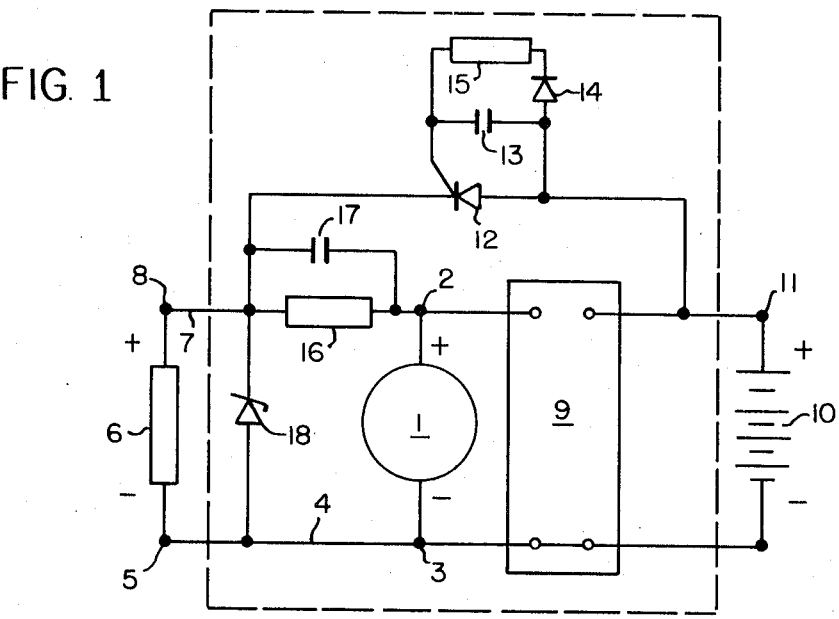

United States Patent

[11] 3,568,031

| [72] | Inventor | Klaus Eberts<br>Grunwaldweg 4, 647 Budingen/Hessen, Germany |
|---|---|---|
| [21] | Appl. No. | 867,255 |
| [22] | Filed | Oct. 17, 1969 |
| [45] | Patented | Mar. 2, 1971 |

[54] VEHICLE POWER SUPPLY FOR BATTERY CHARGING AND LOAD SUPPLY
8 Claims, 3 Drawing Figs.

[52] U.S. Cl. .................................................. 320/5,
307/66, 320/14, 320/40, 320/56, 320/61
[51] Int. Cl. ............................................ H02j 7/14
[50] Field of Search .................................. 322/7, 8;
307/20, 21, 28, 29, 38, 39, 41, 64—68, 70, 76, 80, 81, 150; 320/(SCR), (TD), 61, 64, 39, 40, 14, 19, 5, 10, 9, 56

[56] References Cited
UNITED STATES PATENTS

| 2,692,953 | 10/1954 | Markett, Jr. .................. | 307/80X |
| 2,787,752 | 4/1957 | Neild ............................ | 320/40X |
| 3,127,518 | 3/1964 | Pruitt ............................ | 307/38X |
| 3,293,443 | 12/1966 | Burch, Jr. ..................... | 307/68X |
| 3,356,857 | 12/1967 | Strassen et al. .............. | 307/66 |
| 3,457,491 | 7/1969 | Black et al. .................. | 320/61X |
| 3,469,073 | 9/1969 | Zechin ......................... | 307/29X |
| 3,497,791 | 2/1970 | Moore ......................... | 320/TD(UX) |

Primary Examiner—J. D. Miller
Assistant Examiner—John M. Gunther
Attorney—Shlesinger, Fitzsimmons & Shlesinger

ABSTRACT: A circuit is disclosed in which a current responsive bistable regulator automatically interrupts the charging of a battery when the latter reaches a predetermined voltage. The dynamo source, however, continues to supply the miscellaneous loads of the vehicle. When the dynamo is cut off the loads are fed by the battery through a thyristor which is shut off when the dynamo is reenergized.

PATENTED MAR 2 1971

3,568,031

SHEET 1 OF 2

INVENTOR.
KLAUS EBERTS

BY

Shlesinger, Fitzsimmons & Shlesinger

ATTORNEYS

VEHICLE POWER SUPPLY FOR BATTERY CHARGING AND LOAD SUPPLY

This invention relates to systems for the supply in vehicles of direct electric current, in particular, lighting current.

Generally, direct current supply systems for vehicles comprise a dynamo, and a battery which is connected in parallel to the dynamo through a regulator, the load being parallel to the battery. In systems of this kind, a charging voltage is continued to be applied to the battery after the latter has been fully charged, so long as the dynamo is operating. This detrimental to the life of the battery. The regulators heretofore used could only prevent the final voltage of the battery—which is equal to the voltage of the load—from exceeding a predetermined maximum. They were not effective in interrupting the charge of the battery after the latter had been fully charged.

It is an object of the present invention to provide a system for the supply in vehicles of direct electric current, free from these drawbacks.

According to the present invention, a system for the supply in vehicles of direct electric current comprises a dynamo, a battery and a charging regulator, said battery being connected in parallel to said dynamo through said regulator and to a load, said regulator being adapted to interrupt automatically the charging of said battery after the latter has reached a predetermined voltage and the charging current has dropped below a predetermined value, and in which the negative output terminal of said dynamo is permanently connected to the negative terminal of said battery and to the negative input terminal of said load, the positive output terminal of said dynamo is connected through a control member of said regulator to the positive terminal of said battery and permanently connected to the line leading to the positive input terminal of said load, and in which the positive terminal of said battery is connected to said line through a thyristor which is so controlled that it becomes conductive when the dynamo voltage disappears and becomes nonconductive when the dynamo voltage reappears.

Preferably, the voltage supplied by the dynamo to the load is stabilized.

It is also preferred to combine all the above-mentioned components of the system according to the invention—with the exception of the battery—into one unit.

The control member for the regulator may be formed by the emitter-collector junction of a transistor. The base electrode of that transistor may be controlled as known by means of a Zener diode so that the voltage at the terminals of the battery cannot exceed the final charging voltage which is determined by that diode. A second transistor may be kept in the conductive condition through the voltage drop caused in a resistor in series with the first transistor by the charging current, the two transistors forming a bistable trigger circuit. This circuit changes from its first to its second stable position and thereby interrupts the charging current when that current and consequently the voltage drop across the resistor in the charging circuit falls below a predetermined value. The control electrode of the thyristor may be connected to its cathode by a condenser. Another diode and another resistor, both in series with each other, may be arranged parallel to said condenser. The thyristor is so controlled by the aforedescribed combination of elements that, in the event of the dynamo voltage disappearing, the battery can supply current to the load through the thryristor. A further resistor and a further condenser, both in parallel, may be arranged in the line which connects the dynamo to the load. The last-mentioned condenser is charged through the thyristor and the battery when the dynamo voltage reappears, so that the charging current of that condenser blocks the thyristor. Thus the connection between battery and load through the thyristor is interrupted when voltage exists at the output terminals of the dynamo.

It is preferred to insert between the dynamo and the load in a known manner electronic means which stabilize the voltage at the load. These means may consist, for instance, of a Zener diode and a resistor at its entry side, or of a transistor with a Zener diode. These means prevent the occurrence of excessive voltage at the terminals of the load when the dynamo rotates at high speed and the charging of the battery has been terminated.

Figure 2:
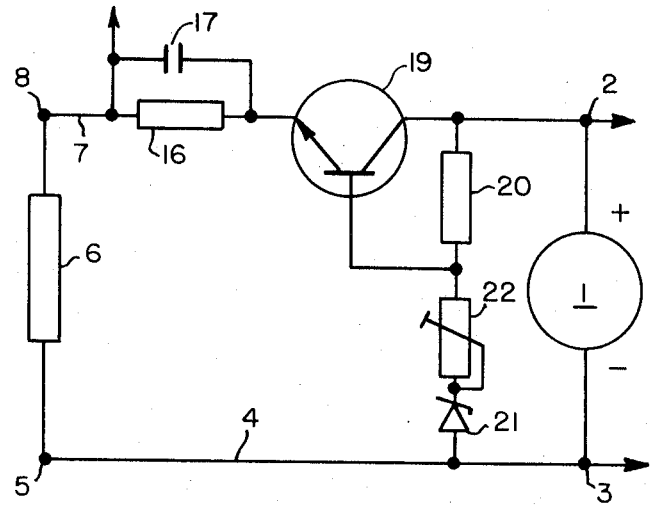
Figure 3:
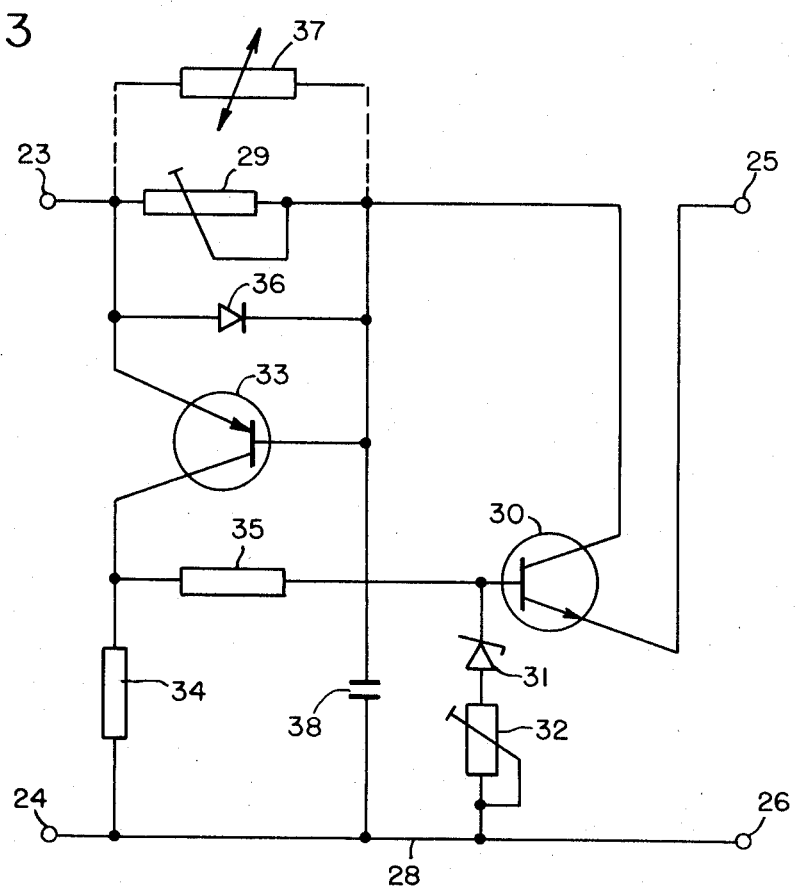

Several embodiments of the invention will now be described by way of example with reference to the accompanying drawings in which:

FIG. 1 is a diagram of a system for the supply of direct electric current in accordance with the invention, FIG. 2 is a part diagram of another system for the supply of direct electric current which is similar to the system of FIG. 1 and includes means for stabilizing the voltage across the load, FIG. 3 is a diagram of the charging regulator provided in the system of FIG. 1.

In FIG. 1, 1 indicates a dynamo having a positive output terminal 2 and a negative output terminal 3 for the supply of direct electric current. The negative terminal 3 is connected through a line 4 with the negative input terminal 5 of a load 6, and the positive terminal 2 is connected through a line 7 with the positive input terminal 8 of the load. The terminals 2 and 3 are further connected through a charging regulator 9 to a battery 10. The positive terminal 11 of the battery 10 is connected through a thyristor 12 to the line 7. The cathode of the thyristor is connected to the positive terminal 11 of the battery, and the anode of the thyristor is connected to the line 7. Arranged between the control electrode of the thyristor 12 and its cathode is a condenser 13, a diode 14 and a resistor 15, the two latter in series with each other, being parallel to the condenser 13. A further resistor 16 is arranged in line 7 between the positive output terminal 2 of the dynamo 1 and the positive input terminal 8 of the load, and a further condenser 17 is arranged parallel to the resistor 16.

The thyristor 12 is in the blocked condition when the dynamo 1 is operative. When the dynamo 1 is inoperative, the condenser 13 is charged, whereby the thyristor 12 is deblocked and the battery 10 thereby placed in circuit parallel to the load 6. If, thereafter, the dynamo 1 resumes operation, the condenser 17 is charged with the thyristor 12 and the battery 10. The current charging the condenser 17 controls the thyristor 12 so that the latter is blocked again, whereby the connection between battery 10 and load 6 is interrupted.

In the system shown in FIG. 1 a Zener diode 18 is provided for stabilizing the voltage is not required.

In the system shown in FIG. 2, a transistor 19 is provided for stabilizing the voltage supplied by the dynamo 1 to the load 6, the collector-electrode of that transistor being connected to the positive terminal 2 of the dynamo 1 and its emitter-electrode being connected to the line 7. The base-electrode of the transistor 19 is connected through a resistor 20 to the collector-electrode and through a Zener diode 21 and, if so required, through an adjustable resistor 22 to the negative terminal 3 of the dynamo 1.

As stated before, the thyristor 12 is blocked by the condenser 17 upon voltage reappearing at the terminals of dynamo 1. However, the condenser 17 may be dispensed with if the Zener diodes 18 and 21 are so dimensioned that the voltage supplied to the load 6 by the dynamo 1 is equal or somewhat greater than the voltage of the battery 10 minus the knee voltage of the thyristor, as in such a case the thyristor 12 is automatically blocked when the dynamo voltage reappears.

FIG. 3 shows the circuitry of the charging regulator 9 which in FIG. 1 is merely diagrammatically shown. The input terminals 23 and 24 of that regulator are permanently connected to the positive and negative output terminals 2 and 3 respectively of the dynamo 1. The output terminals 25 and 26 of the regulator 9 are connected to the positive and negative terminals 11 and 27 respectively of the battery 10. Input terminal 24 and output terminal 26 are connected directly to each other by a line 28. A resistor 29 is arranged in the line between the input terminal 23 and the output terminal 25, said resistor being preferably adjustable. Arranged in the same line is further the emitter-collector junction of an NPN transistor 30 which forms the control member of the charging regulator. The base electrode of transistor 30 is connected through a Zener diode 31 and, if desired, through an adjustable resistor 32 in series therewith to the line 28. The transistor 30 is combined with a PNP transistor 33 to a bistable trigger circuit which is controlled by the voltage drop in the resistor 29. The emitter-electrode of the transistor 33 is directly connected to the input terminal 23 and its collector-electrode is connected through a resistor 34 to the line 28. The latter electrode is also connected to the base electrode of transistor 30 through a resistor 35. The resistor 29 is arranged between the emitter-electrode and the base electrode of the transistor 33. A diode 36 and, if desired, an NTC resistor 37 are each parallel to the resistor 29. Finally, a condenser 38 is arranged between the line 28 and the line connecting the resistor 29 to the collector-electrode of the transistor 30.

When the dynamo 1 becomes operative, the condenser 38 is charged through the resistor 29 and the diode 36 and thus provides by its charging current a voltage drop across the resistor 34. This voltage drop controls transistor 33, which in turn controls transistor 30, so that the charging current flows through resistor 29, diode 36 and transistor 30 to the battery 10. When that battery has been charged up to 80 percent of its capacity, the terminal voltage of the battery becomes so great that current begins to flow through the Zener diode 31 and the resistor 32. The transistor 30 is so controlled that the terminal voltage of the battery cannot rise any further and remains constant. The resistor 29 is so adjusted that its voltage drop is below the value required for controlling the transistor 33 when the charging current has reached a predetermined minimum value. In this event, the trigger circuit charges over and the transistor 30 is blocked, whereby the charging circuit is interrupted.

Thus two electrical criteria are used in the charging regulator 9 for interrupting the charging current, one of them being the appearance of a predetermined voltage at the terminals of the battery, and the other one being the drop below a predetermined small charging current representative of the terminal voltage of the battery. By using a predetermined small charging current which depends on the capacity of the battery and which just suffices to maintain the predetermined terminal voltage of the latter, it is ensured that the battery is fully charged without any appreciable losses of water.

It is preferred to combine into a single unit those components of the system which in FIG. 1 are shown to be within the chain lines.

I claim:

1. A current supply system for vehicles comprising a dynamo for supplying direct current, a battery and a charging regulator, said battery being connected in parallel to said dynamo through said regulator and to a load, said regulator being adapted to interrupt automatically the charging of said battery after the latter has reached a predetermined voltage and the charging current has dropped below a predetermined value, and in which the negative output terminal of said dynamo is permanently connected to the negative input terminal of said load, the positive output terminal of said dynamo is connected through a control member of said regulator to the positive terminal of said battery and permanently connected to the line leading to the positive input terminal of said load, and in which the positive terminal of said battery is connected to said line through a thyristor which is so controlled that it becomes conductive when the dynamo voltage disappears and becomes nonconductive when the dynamo voltage reappears.

2. A current supply system according to claim 1 in which the voltage which is supplied from the dynamo to the load is stabilized.

3. A current supply system according to claim 1 in which the dynamo and all other components of the system, except the battery, are combined into one unit.

4. A current supply system according to claim 1 in which a condenser is arranged between the control electrode and the cathode of said thyristor, a diode and a resistor being both in series with each other and parallel to that thyristor and in which the anode of said thyristor is directly connected to the load and is connected to the positive output terminal of said dynamo through a condenser and a resistor which latter are both in parallel.

5. A current supply system according to claim 1 in which the control member of said regulator is formed by a transistor whose emitter-collector junction is arranged in the circuit of the charging current and whose base electrode is connected through a Zener diode to a terminal of said battery, in which a resistor is arranged in said circuit in series to the emitter-collector junction, in which the voltage across said resistor is applied to the base electrode and to the emitter-electrode of a further transistor, which, together with the first transistor, is combined to a bistable trigger circuit in such a manner that, in the case of the charging current dropping below a predetermined cutoff value, the transistor in the circuit of the charging current is controlled to become nonconductive.

6. A current supply system according to claim 1 in which a Zener diode is arranged between the lines leading to the load.

7. A current supply system according to claim 1 in which one of the terminals of the dynamo is connected through the emitter-collector junction of a transistor to the line leading to the load, and in which the base electrode of said transistor is connected through a Zener diode to the other line leading to the load and through a resistor to the collector-electrode.

8. A current supply system according to claim 1 in which the Zener diode for stabilizing the load voltage is so selected that this diode controls the voltage supplied by the dynamo to a value which is equal to or somewhat greater than the battery voltage.